United States Patent [19]
Curtis

[11] 4,376,327
[45] Mar. 15, 1983

[54] WATER POWERED SAUSAGE STUFFER

[76] Inventor: David C. Curtis, 400 W. Palatine Rd., Arlington Heights, Ill. 60004

[21] Appl. No.: 229,344

[22] Filed: Jan. 29, 1981

[51] Int. Cl.³ .......................................... A22C 11/06
[52] U.S. Cl. ........................................................ 17/39
[58] Field of Search ................................... 17/39, 38

[56] References Cited

U.S. PATENT DOCUMENTS

| | | | |
|---|---|---|---|
| 294,826 | 3/1884 | Tuerk, Jr. | 17/39 |
| 485,576 | 11/1892 | Eppler | 17/39 |
| 859,535 | 7/1907 | Zimmers | 17/38 |
| 894,039 | 7/1908 | Napier | 17/39 |
| 3,670,362 | 6/1972 | Hughes | 17/39 |

*Primary Examiner*—Willie G. Abercrombie
*Attorney, Agent, or Firm*—Wm. A. Snow

[57] ABSTRACT

A horizontally positioned sausage stuffer having an elongated, cylindrical hopper, a removable outlet opening having an elongated, rigid, plastic tube extending therefrom, including a piston in the hopper actuated by water pressure from a city or town water faucet, and means to control the water.

4 Claims, 7 Drawing Figures

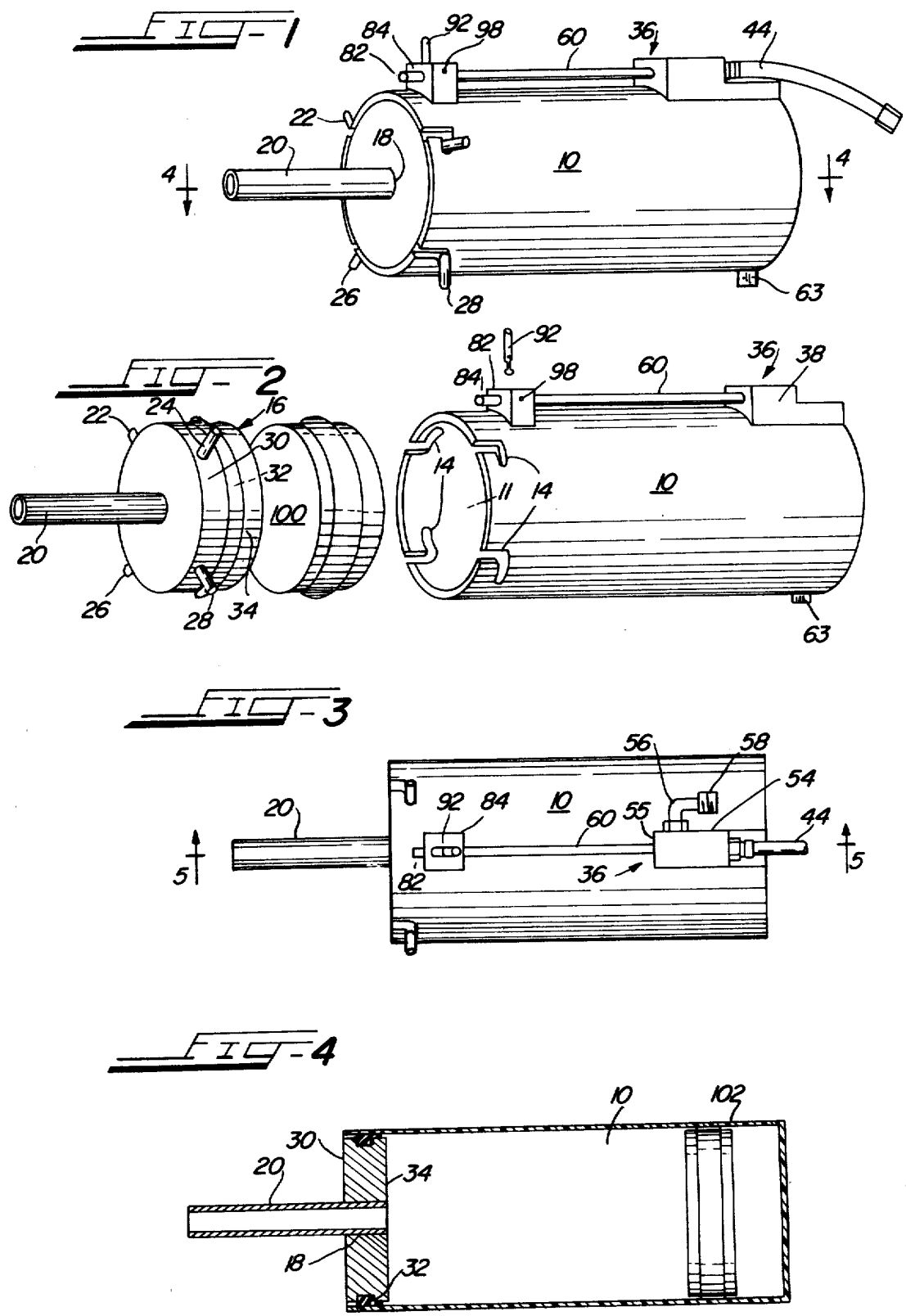

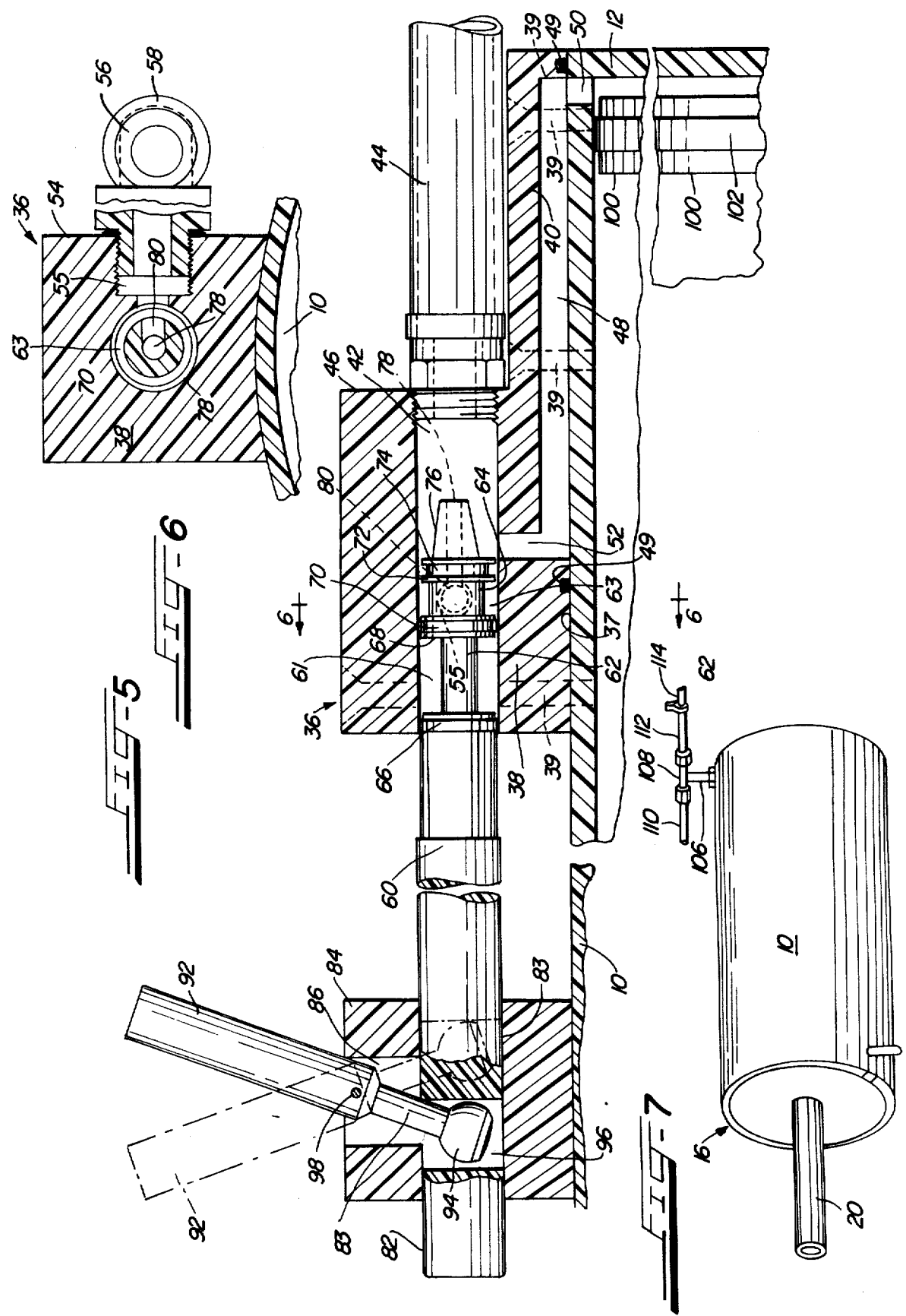

WATER POWERED SAUSAGE STUFFER

SUMMARY OF THE INVENTION

A horizontally disposed, cylindrical hopper or housing closed at one end and a removable closure at the other end having an elongated, plastic tube anchored thereto and extending outwardly horizontally from the removable closure, a piston in said housing, means to shift said piston in said housing using city or town water pressure, means to control said water entering said housing and means to allow the water to go down a drain when the apparatus is closed off.

BRIEF DESCRIPTION OF THE DRAWINGS

FIG. 1 is a perspective view of the device of the present invention;

FIG. 2 is a perspective expanded view of the parts of the present invention;

FIG. 3 is a top elevational view;

FIG. 4 is a cross-sectional view taken on the lines 4—4 of FIG. 1;

FIG. 5 is a cross-sectional view taken on the lines 5—5 of FIG. 3 showing the valving in discharge position;

FIG. 6 is a cross-sectional view taken on the lines 6—6 of FIG. 5; and

FIG. 7 is a perspective view of a modified form of the invention.

DETAILED DESCRIPTION OF THE DRAWINGS

As shown in the drawings, the elongated cylinder 10 is preferably constructed of stainless steel or aluminum having a closed end 12 and the cylinder is arranged to be used in a horizontal position. The wall around the open end 11 of the cylinder is provided with four equi-distant bayonet slots 14. The closure for the open end is a thick, cylindrical, flat cover 16 having an axial opening 18 into which one end of an elongated tube 20 is secured. The cover is also provided with four outwardly extending, short arms 22, 24, 26 and 28 spaced equi-distantly around the side wall 30 of the cover plate and anchored thereto. A lip seal 32 seats in the circumferential slot in the side wall 30 of the cover 16.

The cover 16 is of a diameter to seat in the open end 11 of the cylinder 10 with the short arms 22, 24, 26, 28 arranged to be seated in the respective bayonet slots 14 and project outwardly of the outer cylindrical wall. The arms 26, 28 act as front feet for the cylinder 10 as it is used in a horizontal position. The lip seal 32 seats the cover snugly against the inner wall of the cylinder 10.

A water control 36 comprises a housing 38 having an offset 40 integrally formed thereon with the offset extending rearwardly. The housing 38 is provided with a through, horizontal, cylindrical opening 42 therein and has a discharge hose 44 connected to the rear wall 46 of the housing 38 and communicates with the opening 42. The housing 38 and offset 40 are secured to the upper side of the cylinder 10 adjacent the rear end 12 by flat headed screws 39 or the like.

The lower wall 37 of the housing 38 and offset 40 has a slight radius and is provided with a channel 48 having communication with the interior of the cylinder 10 through aperture 50. The cylindrical port 52 in the housing 38 has communication with the channel 48. A rectangular channel having an "O" ring 49 therein is positioned about the channel 48 to insure no leakage problem. A threaded aperture is positioned on the side wall 54 of the housing 38 to which an elbow fitting 56 is secured, having female threads 58 on the free end to which a hose is secured to supply water under city or town water pressure.

One end of a solid rod 60 is provided with a pair of reduced, axial, cylindrical portions 62, 64 therein. The rod 60 is provided with an "O" ring 66 seated in a circumferential groove adjacent the portion 62 to bear against the inner wall of the cylindrical opening 42. A wall 68 is provided with a circumferential groove in which an "O" ring 70 is seated to bear against the inner wall forming the cylindrical opening 42. The area 61 around the portion 62 acts as the water inlet from the water source to the channel 48 when in operative position. The portion 64 is larger in diameter than the reduced cylindrical portion 62 and is provided with an end wall 72 having a circumferential groove therein to seat an "O" ring 74 to bear against the inner wall forming the cylindrical opening 42. The area 63 around the portion 64 acts as a water discharge area. The end 76 of the rod is tapered and provided with an axial discharge opening 78 communicating with the bore 80 in the portion 64. The bore 80 is in direct communication with the water inlet 55.

The end 82 of the rod 60 is slidably mounted in opening 83 in housing 84 which is secured to the outer wall of the cylinder 10 adjacent its front end 11 by any suitable means. The rod 60 is positioned horizontally above the cylinder 10 and slidable in the housings 38 and 84. An oval shaped opening 86 is formed in the housing which communicates with an opening 96 in rod 60.

A metal actuating rod 92 is positioned in the oval shaped opening 86 in the upper end of the housing 84 and provided with an axial offset and the ball shaped end 94 is inserted in an opening 96 in rod 60. The rod 92 is pivotally secured medially in the oval shaped opening 86 by a pin 98 so that the rod may shift forwardly and rearwardly. See FIG. 5.

A piston 100 is readily shiftable in the cylinder hopper 10 and is provided with a circumferential groove to seat a lip seal 102 to seat against the inner wall of the cylinder and prevent the water to the rear of the piston from seeping forwardly of the piston.

A foot 63 extends outwardly of and is secured to the cylinder 10 adjacent the rear wall 12 and is positioned off the center of the cylinder to assist in preventing the cylinder from rolling.

In operation, the cylinder is positioned horizontally and the piston placed in the cylinder where it will shift to the rear end of the cylinder. The cylinder is then filled with sausage meat. The cover 16 is placed on the end 11. A sausage skin is slipped over the tube 20 and bunched thereon and the end is tied in the usual manner. Now the home water under city pressure is supplied through a hose to the elbow 56, after the rod 92 is moved forwardly, as shown in dotted lines in FIG. 5, moving the area 61 in the center of the port 55. The water under pressure will flow into the area 61 around the portion 62 and through the port 52 and to the channel 48 and through port 50 into the cylinder to force the piston 100 forwardly and the sausage meat therein outwardly through the tube 20 and into the sausage skin. The amount of water entering the cylinder 10 can be controlled by moving the rod 10 forwardly to partially close the port 52 thereby slowing down the discharge of the sausage meat through the tube 20.

To close off the water entering the cylinder, the handle rod 92 is moved to the vertical position. The water from inlet 55 will now enter the area 61. As the port 52 is not yet opened to the area 61, the water can only enter the area 61 and not be dispersed.

To draw back the water entering the cylinder, the rod 92 is shifted to the full line position, as shown in FIG. 5, thus closing the inlet port 52. The water will flow through the inlet 55, the boss 80 and through the opening 78 under a kind of venturi-like action to the overflow hose 44 to the drain. Because of the venturi-like action, the water in the cylinder 10 will tend to be withdrawn through the port 52 and release the pressure on the piston. It is to be noted the area 63 is a great deal less than the area 61.

In the modification shown in FIG. 7, everything is identical as in the preferred embodiment except no water control 36 or rod 60 or housing 84 and its appendages are used. Instead, a short pipe 106 is threadedly secured to the cylinder 10 and to the port 50. A "T" fitting 108 is secured to the top end of the pipe 106. A water inlet hose 110 is connected to one side of the "T" fitting and the free end connected to the faucet water supply. The other end of the "T" fitting is connected to a discharge hose 112, the free end of which extends to a drain.

A hose clamp 114 is secured as shown in FIG. 7. When the clamp 114 is closed, the water under pressure will flow below the piston 100 and the action will be as described above with reference to the preferred embodiment on filling a sausage skin. When the clamp 114 is not in clamping position, the water will flow through the hose 112 to the drain. Therefore the sausage filling operation will be halted.

This modification requires only a pair of opposed bayonet slots and a pair of arms to seat the cover in the forward end of the cylinder. The cylinder is preferably set on a stand to support the cylinder in horizontal position.

Except as otherwise state, all the working elements are produced from plastic, such as polyethylene or nylon or the like. The cylinder may have variable capacities for sausage meat that is preferably from five pounds to fifty pounds by lengthening the cylinder variably from 14 to 29 inches and variably increasing the diameter from 4¼ to 9 inches. Therefore the apparatus is extremely light in weight.

It will be understood that details of the constructions shown may be altered or omitted without departing from the spirit of the invention as defined by the following claims.

I claim:

1. A water powered sausage stuffing apparatus comprising:
   (a) an enlarged, horizontally disposed cylinder, open at one end and closed at the other end, an inlet port adjacent said closed end;
   (b) a flat cylindrical cover having a side wall for closing the open end of said cylinder and means to removably secure the cover to the open end of said cylinder and an elongated tube secured to said cover axially thereof and extending outwardly therefrom and having communication with the interior of said cylinder;
   (c) a piston disposed in said cylinder and movable therein;
   (d) means to control house water under pressure to the interior of said cylinder and behind said piston; and
   said means to control the water comprises a pair of spaced housings positioned on top of said cylinder, one positioned adjacent said open end and the other adjacent the closed end of said cylinder, each housing having a longitudinal through opening therein, an elongated rod shiftable in the openings having a forward end and a rear tapered end, a pair of large and small cylindrical offsets in said rod adjacent the rear end of said rod, said housing adjacent said closed end of said cylinder having bottom, side and end walls, an elongated channel in said bottom wall having communication with said inlet port in said cylinder at one end thereof, a second port having communication with the opposed end of said channel and having communication with the longitudinal opening in said rear housing and said offsets, a bore in the larger offsets, said tapered end having an axial opening therein communicating with said bore, a water inlet in the side wall of said housing having communication with the area around said small offset and said bore by the longitudinal shifting of said rod, an oval shaped bore in said housing positioned adjacent said open end of said cylinder, a cylindrical bore in said rod having communication with said oval bore, a handle rod having a ball on one end positioned in said oval shaped bore and said ball frictionally seated in said cylindrical bore, movement fore and aft of said handle rod to shift said rods fore and aft to position said offsets relative to said water inlet.

2. A water powered sausage stuffing apparatus comprising an elongated cylinder of substantial diameter positioned horizontally, having a front open end and a rear closed end, four equi-distantly spaced bayonet slots in the cylinder adjacent the front end, a flat cylindrical closure for said open end having four equi-distant pins secured thereto and extending outwardly for seating in said bayonet slots for positioning said cover and closing off said open end, a threaded axial opening in said cover, a tube, one end of said tube secured in said opening and the other end extending axially outwardly thereof, a port in said cylinder adjacent said closed end, a piston in said cylinder, a water control comprising a housing having an offset and positioned adjacent said rear end, anchored to said cylinder, said housing having a bottom, said and end walls, the bottom wall of said housing and offset having a radius and containing a channel therein communicating with said port at one end and communicating with the interior of said cylinder, said housing having a through longitudinal opening therein, water inlet and outlet ports communicating with said opening, an elongated rod, one end of said rod having separate water inlet and outlet areas therein and a tapered end, a boss in said rod in said water outlet area having communication with an axial opening in said tapered end, a discharge hose secured to the end of said housing having communication with said tapered end, a port extending from said water inlet area in said rod having communication with said channel at the other end of the first mentioned port therein, means to shift said rod longitudinally to allow water to enter said inlet area under pressure through said latter port to the channel and to the cylinder port to shift said piston.

3. The apparatus according to claim 2 wherein the means to shift the rod comprises a housing secured to the upper side of said cylinder adjacent the front end thereof, an oval-shaped opening in said housing, a cylindrical opening in said rod adjacent the opposed end, an elongated handle rod having a ball on one end, said rod positioned in said oval opening with the ball seated in said cylindrical opening, and means to pivot said rod adjacent the upper end of said housing.

4. In a water powered sausage stuffing apparatus comprising:
   (a) An elongated, horizontally disposed cylinder having a front open end and a rear closed end,
      (1) a port adjacent the rear end,
      (2) four bayonet slots in said cylinder adjacent said front end spaced equi-distantly around said front end;
   (b) A cylindrical cover to removably close the front end of said cylinder and having front and rear flat faces and a side wall,
      (1) four equi-distantly spaced arms secured to said wall and extending outwardly thereof for seating in said bayonet slots,
      (2) an axial aperture between said faces,
      (3) a tube secured at one end in said aperture and extending outwardly therefrom;
   (c) a piston in said cylinder positioned adjacent the rear end thereof;
   (d) a water control means comprising a first housing on said cylinder having an offset secured on top of said cylinder adjacent the rear end thereof,
      (1) said housing having side, bottom, end and rear walls,
      (2) the bottom wall provided with a radius to seat on and be secured to said cylinder,
      (3) an elongated channel in said housing and offset,
      (4) a port in said channel at one end communicating with the port in the cylinder,
      (5) a through opening in said side walls,
      (6) a drain tube, one end secured to said opening,
      (7) a water inlet port in one of said side walls, extending interiorally in said opening, means to supply water to said water inlet,
      (8) a port extending between the other end of said channel and said opening;
   (e) a second housing secured to the top of said cylinder adjacent the front end having end, top and bottom walls,
      (1) a through opening in said end walls aligned with the opening in said first housing,
      (2) an oval-shaped opening extending from said top and bottom walls;
   (f) a rod having a forward and rear end for seating in said first and second housings, and shiftable longitudinally therein,
      (1) a small in diameter offset in said rod adjacent the rear end of said rod,
      (2) a larger diameter offset rearward of said small diameter offset,
      (3) a taper on the rear end of said rod,
      (4) a boss in said larger offset,
      (5) an axial opening in said rear end of said rod and tapered end communicating with said boss,
      (6) a seat adjacent the forward end of said rod;
   (g) a handle having a lower end,
      (1) a ball on the lower end of said handle
      (2) said handle extending partially through said oval-shaped opening and said ball positioned in said seat in said rod;

whereby when said handle is shifted forwardly toward the front end of said cylinder, the rod will be shifted so that the water port will be in communication with the area around the smaller diameter offset in the rod and in communication with the channel through the two ports therein to supply water to the cylinder behind the piston to move the piston forwardly, and when the handle is shifted rearwardly, the rod will shift so that the area around the larger diameter offset in the rod will have communication with the water inlet and the water will flow through the bore and outwardly through the axial opening in the end of the rod and outwardly through the drain tube, such action releasing the water pressure in the cylinder and allowing it to backflow through the channel and its ports and outwardly through the opening in the rear cylinder and to the drain.

* * * * *